Sept. 11, 1962 F. KÖRLING 3,053,601
DEVICE FOR MOUNTING EDGE GLAZINGS ON GOODS-DISPLAY
TABLES, COUNTERS, AND THE LIKE
Filed Sept. 3, 1959 2 Sheets-Sheet 2
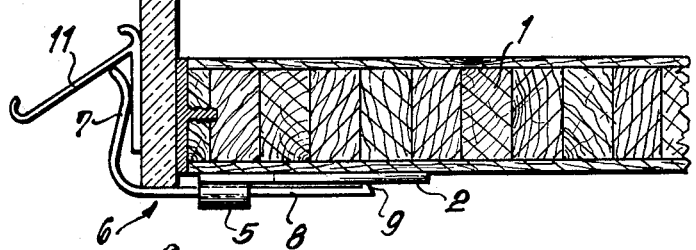
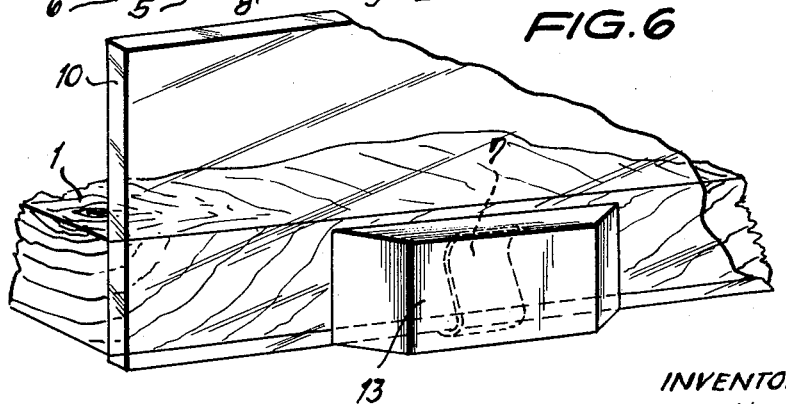
INVENTOR
FRANZ KÖRLING.
ATTORNEYS 3,053,601
DEVICE FOR MOUNTING EDGE GLAZINGS ON GOODS-DISPLAY TABLES, COUNTERS, AND THE LIKE
Franz Körling, Wilhelmstr. 33, Dortmund, Germany
Filed Sept. 3, 1959, Ser. No. 837,951
Claims priority, application Germany Sept. 6, 1958
1 Claim. (Cl. 312—140.3)

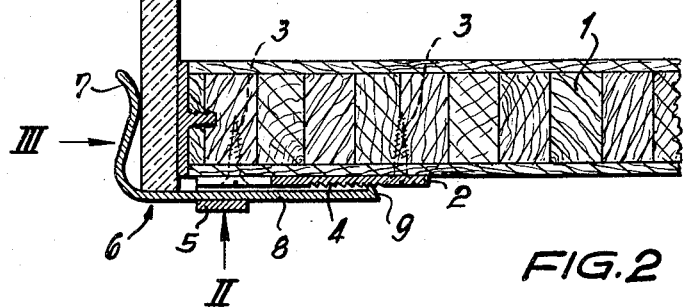
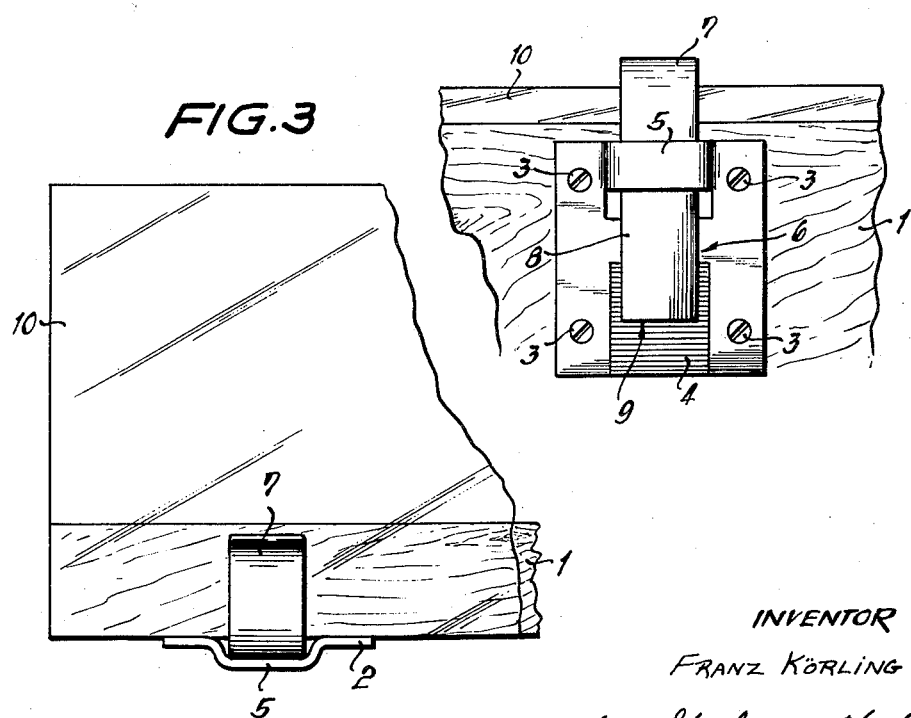

The present invention relates to goods-display tables, counters, cases and suchlike selling stands usually set up in shops, and having an edge glazing serving principally to screen off the goods on display on the table from the buying space. Such glazing, usually in the form of glass strips, is fixed at the edge of the display counter according to the customary methods by various expedients at an angle to the bearing surface. Use is made for this purpose either of special, appropriately shaped supports which are fastened with the aid of additional means to the table top, or slots are provided in the table top in which the glass is mounted with the aid of clamp screws or clamping clasps in a somewhat cumbersome manner.

The present invention aims at providing a simple mounting of such edge glazings on the display counters of various types, while at the same time making it possible for the glazing to be easily removed and permitting the arrangement of supplementary parts simultaneously with the glazing. This aim is attained according to the invention by means of a clamping device which consists of an angular strap, one limb of which is resilient and its other limb adapted to be adjustably secured beneath the table plate. The retention of said clamping strap beneath the table-counter-top may be effected by means of a stirrup and a rack plate in such a form that the clamping strap is pushed through by the rigid limb between the stirrup and the lower side of the table top and with its hook-shaped end engages in the correspondingly toothed rack plate. The glass plate disposed vertically in front of the edge of the table plate is then clamped in between the resilient limb and the table edge, at any desired angle. In the case of angles other than a right angle, which corresponds to the normal table edge, a suitable wedge strip is inserted between the table edge and the glass sheet.

This method of connection of the glazing with the table thus requires only two elements, namely the retaining means secured beneath the table surface and the displaceable clamping strap held therein. No further manipulation, for example of the table plate, is accordingly necessary. One of the advantages of this arrangement is that the table plate or the entire table after removal of the glazing and the clamping strap can be used for other purposes. This method affords the further advantage that the useful surface of the counter is not curtailed by the mounting of the glazing. The method according to the invention furthermore permits a plurality of counters to be placed in line without resulting in an unused surface. Where step attachments are used or other structural members which serve for setting out the goods on sale, and are of limited dimensions the invention shows advantages in that the fitting of the edge glazing can be carried out without hindrance above the adjoining top sides of the counters. Finally, there is the advantage that due to the displaceability of the clamping strap it is possible for glass sheets of various thicknesses, and in addition yet other members, to be simultaneously clamped in position without requiring further aids.

The form of the clamping strap can be adapted to the particular conditions obtaining in each case and the type of strain, in order to ensure no undesirable looseness or movement.

Exemplified embodiments of the invention are illustrated in the accompanying drawings, wherein:

FIGURE 1 shows a section through a clamping device according to the invention;

FIGURE 2 is a view in the direction of the arrow A in FIGURE 1;

FIGURE 3 is a front view in the direction of the arrow B in FIGURE 1;

FIGURES 4 to 6 show the arrangement of supplementary elements which may be clamped fast at the same time as the glazing.

Referring to the aforesaid drawings retaining means 2 are fastened to the lower side of a supporting plate 1 of a display table with the aid of screws 3. The retaining means 2 has a grooved or toothed surface 4 and is provided with a stirrup 5. A clamping strap 6 with a resilient limb 7 can be pushed through by its rigid limb 8 beneath the stirrup 5 and hooks with the hook-shaped end 9 into the grooved surface 4. Thus the glass sheet 10 is firmly clamped between the resilient limb 7 and the table edge. It can be seen that the glass sheet 10 may be of various thicknesses and that the clamping strap 6 can be adjusted within the limits allowed by its dimensions.

As shown in FIGURE 4, a rail 11 can be clamped between the resilient limb 7 of the clamp 6 and the glass sheet 10 and may serve to exhibit price tickets or other notices. In some circumstances it is desirable, as shown in FIGURE 5, for a covering strip 12 to be clamped firmly with the resilient limb 7, covering the actual resilient limb 7 and in certain circumstances also covering the region lying thereabove. If such strips or rails as shown in FIGURES 4 and 5 are not employed, it may be convenient to cover the projecting resilient limb 7 with a small block 13 (FIG. 6) a recess being provided in said block which engages over the resilient limb 7.

Any suitable materials may be used for the various additional or accessory parts, which are selected from the standpoint of solidity and suchlike technical properties, and/or according to taste.

What I claim is:

In a display case or the like having a wall and a glass plate engaging one edge of the wall and extending therefrom at an angle, a stirrup secured on that face of the wall adjacent such edge opposite the face from which the glass plate extends, a plate secured on the same base as the stirrup, said plate including a section lying further from such edge than the stirrup and aligned with the opening in the stirrup, said section having a transversely grooved surface, and a spring clip having two legs at angles to each other, one of said legs engaging the glass plate to hold it against the edge of the wall and the other leg extending through the stirrup and having a rib on its end engageable with the grooved surface of the section.

References Cited in the file of this patent

UNITED STATES PATENTS

| | | |
|---|---|---|
| 583,943 | Rayman | June 8, 1897 |
| 1,173,872 | Ruse | Feb. 29, 1916 |
| 1,390,427 | Blanchard | Sept. 13, 1921 |
| 1,760,346 | Correa | May 27, 1930 |
| 2,109,847 | Meyer | Mar. 1, 1938 |
| 2,177,187 | Olsen | Oct. 27, 1939 |
| 2,734,789 | Wilson | Feb. 14, 1956 |

FOREIGN PATENTS

| | | |
|---|---|---|
| 949,705 | Germany | Sept. 27, 1956 |